US010623489B2

(12) United States Patent
Lillie et al.

(10) Patent No.: US 10,623,489 B2
(45) Date of Patent: Apr. 14, 2020

(54) SYNC GATEWAY FOR MOBILE APPLICATION DOWNLOAD

(71) Applicant: General Electric Company, Schenectady, NY (US)

(72) Inventors: Terrance L. Lillie, Redwood City, CA (US); Naveen Koka, Pleasanton, CA (US)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 15/800,526

(22) Filed: Nov. 1, 2017

(65) Prior Publication Data

US 2019/0132389 A1    May 2, 2019

(51) Int. Cl.
*H04L 29/08* (2006.01)
*H04L 29/06* (2006.01)
*H04W 88/16* (2009.01)

(52) U.S. Cl.
CPC .......... *H04L 67/1095* (2013.01); *H04L 67/42* (2013.01); *H04L 63/083* (2013.01); *H04W 88/16* (2013.01)

(58) Field of Classification Search
CPC ... H04L 63/083; H04L 63/02; H04L 63/0853; H04L 63/105; H04L 67/1095; H04L 67/42; H04L 67/02; H04L 29/06; H04L 65/4084; H04W 88/16; H04W 28/18; G06F 21/6227
See application file for complete search history.

(56) References Cited

U.S. PATENT DOCUMENTS

| | | | | |
|---|---|---|---|---|
| 2002/0078209 A1* | 6/2002 | Peng | .................. | H04L 29/06 709/227 |
| 2011/0007705 A1* | 1/2011 | Buddhikot | .............. | H04L 63/02 370/331 |
| 2011/0047254 A1* | 2/2011 | Vainionpaa | ........... | H04W 28/18 709/222 |
| 2015/0088934 A1* | 3/2015 | Beckman | ............ | G06F 21/6227 707/781 |
| 2015/0089577 A1* | 3/2015 | Beckman | .............. | H04L 63/105 726/1 |
| 2017/0331821 A1* | 11/2017 | Filippidis | ............ | H04L 63/0853 |
| 2018/0198692 A1* | 7/2018 | Ansari | .................... | H04L 67/02 |
| 2018/0219976 A1* | 8/2018 | Decenzo | ............. | H04L 65/4084 |

* cited by examiner

*Primary Examiner* — Le H Luu

(74) *Attorney, Agent, or Firm* — Buckley, Mascoff & Talwalkar LLC (57) ABSTRACT

The example embodiments are directed to a sync gateway and method that synchronizes a mobile application file stored on a client device with mobile application data stored by a host platform. In an example, the method includes receiving, by a gateway, a request for a mobile application from a client device, the request comprising configuration information for the client device to use to interact with a host platform of the mobile application, downloading, by the gateway, mobile application data from the host platform based on the configuration information received from the client device, generating, by the gateway, a mobile application file for the client device based on the mobile application data downloaded from the host platform, and transmitting, by the gateway, the mobile application file to the client device via a network connection.

17 Claims, 7 Drawing Sheets

SYNC GATEWAY FOR MOBILE APPLICATION DOWNLOAD

BACKGROUND

Machine and equipment assets are engineered to perform one or more tasks as part of a business process. For example, assets can include, among other things and without limitation, industrial manufacturing equipment on a production line, drilling equipment for use in mining operations, wind turbines that generate electricity on a wind farm, transportation vehicles such as trains and aircraft, and the like. As another example, assets may include devices that aid in diagnosing patients such as imaging devices (e.g., X-ray or MRI systems), monitoring equipment, and the like. The design and implementation of these assets often involves both the physics of the task at hand, as well as the environment in which such assets are configured to operate.

Over time, hardware components of an asset can experience wear and tear and software components can require updates and replacement. In some instances, assets can even experience hardware or software failures. To address these issues, many manufacturers and third parties provide field service to ensure that an asset operates smoothly. Field service can include maintenance, updates, and repairs which are often provided by or otherwise controlled by a technician. As cloud-based computing and industrial manufacturing continue to merge, service-based software is becoming more integrated within a cloud environment. For example, a field service software application can provide a comprehensive, cloud-based, and mobile enterprise solution that manages the service delivery end-to-end process for a service technician enabling manufacturers and service providers to grow service revenues, increase service efficiencies, improve customer experience, and address compliance requirements.

Technicians often rely on the field service software application as part of their day-to-day operations. For many technicians, the field service software is downloaded to a mobile client device (e.g., tablet, laptop, smartphone, etc.) at the beginning of the day or at the start of a work order, and is updated as the technician progresses through tasks. The field service software may include a mobile framework that provides the technician with field-ready functionality thereby improving field service productivity. Designed from the ground up with field technicians and engineers in mind, the field service software may provide a refined interface, consistent access, and targeted service workflows. Through the field service software, the technician can successfully complete complex work orders, present service reports for customer signature, and provide dynamic pricing of labor, parts and products while in the field.

However, related field service software has various drawbacks. For example, the client device executing the field service software typically requires significant JavaScript code for downloading the transaction data from a host platform. As a result, the download, especially an initial download, can take a great deal of time (e.g., 20 minutes or longer). When a technician is waiting for the transaction data to download, the technician may become impatient and submit another command to the host platform while the host platform is busy transferring the application to the client device. In some cases, the host platform will not provide the technician with a visible response causing the technician to wonder if anything is happening. Furthermore, technicians often perform service in remote locations such as within tunnels, buildings, out at sea, and the like, where Internet connectivity can be unreliable. When the client device loses a connection to the host platform while downloading the transactional data, the download must be restarted. Accordingly, what is needed is an improved system for transmitting field service software to a client device.

SUMMARY

Embodiments described herein improve upon the prior art by providing a sync gateway for downloading and synchronizing a mobile application database file on the client device with a mobile application database file produced on the sync gateway through interactions with a host platform. The sync gateway significantly improves performance in relation to existing JavaScript sync engines that are used by a client device to interact directly with the host platform. The performance improvement occurs because the sync gateway code may be written to be multi-threaded and the connection to the platform host may be maintained over a reliable, low-latency connection. During a download to the client device, the sync gateway provides on-demand generation of a mobile application database file for the client device which can be a client/technician specific file based on a profile configuration of the client/technician. The sync gateway interacts with the host platform in place of the client device and acquires initial or updated mobile application data, generates a reduced size mobile application data file, and transfers the mobile application file to the client device. Furthermore, when a connection is broken between the sync gateway and the client device, the sync gateway can resume a download from the point of interruption after the connection is restored. The sync gateway may be incorporated within software that is deployed on a cloud platform or other platform.

In an aspect of an example embodiment, a computer-implemented method includes receiving, by a gateway, a request for a mobile application from a client device, the request comprising configuration information for the client device to use to interact with a host platform of the mobile application, downloading, by the gateway, mobile application data from the host platform based on the configuration information received from the platform host, generating, by the gateway, a mobile application file for the client device based on the mobile application data downloaded from the host platform, and transmitting, by the gateway, the mobile application file to the client device via a network connection.

In an aspect of another example embodiment, a computing system includes a network interface configured to receive a request for a mobile application from a client device, the request comprising configuration information for the client device to use to interact with a host platform of the mobile application, and a processor configured to download, via a gateway, mobile application data from the host platform based on the configuration information received from the client device, and generate, via the gateway, a mobile application file for the client device based on the mobile application data downloaded from the host platform, wherein the processor further controls the network interface to transmit the mobile application file to the client device via a network connection.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Example embodiments are directed to a sync gateway for downloading and updating mobile application data on a client device. The sync gateway may be a microservice or other software program that is inserted within a back-end platform such as a host platform or cloud computing environment where the application configuration data and transaction data is hosted. Traditionally, field-service related mobile software applications have interacted with a host back-end through a set of complex Representational State Transfer (REST) operations. In this case, mobile clients are typically required to run a JavaScript-based sync engine to support these interactions, which, over time, has grown significantly in complexity. Furthermore, it is estimated that field service software will expand its architecture to include synchronizing a local data set of a mobile device with multiple back-end data repositories. The sync gateway significantly improves the speed at which mobile application data is downloaded to the client device by using overlapped asynchronous threads for retrieving configuration data and exchanging transactional data with the host platform. Furthermore, the sync gateway uses a vastly simplified REST application programming interface (API) to interact with the client device to deliver the mobile application data to the client device. As a result, complex client-side JavaScript sync engine code is no longer needed.

The sync gateway may receive a download/sync request from a client device and handle interactions with multiple target data repositories on behalf of the client device. For example, the sync gateway may receive configuration information from one of the host platforms and use this configuration to query the target data repositories. Based on the data received from the data repositories, the sync gateway can prepare an encrypted database file (e.g., SQLite file) containing the results of the download/sync request and deliver the encrypted database file to the client device as a culmination of the sync operation. The sync gateway has been designed so that the client device can alternate or simultaneously receive data (i.e., perform sync operations) with multiple back-end platforms when a data model is spread across multiple platforms. Furthermore, the sync gateway can also update the target data repositories when the client device makes changes to the database files. For example, the sync gateway may receive an updated database file from the client device during a synchronization request from the client device, and synchronize both the client device and the host platform based on updates performed on each side.

The sync gateway described herein may be a service or other software program that is deployed in a platform such as a cloud platform computing environment used as an Internet of Things (IoT) or an Industrial Internet of Things (IIoT) platform. While progress with machine and equipment automation has been made over the last several decades, and assets have become 'smarter,' the intelligence of any individual asset pales in comparison to intelligence that can be gained when multiple smart devices are connected together, for example, in the cloud. Assets, as described herein, may refer to equipment and machines used in fields such as energy, healthcare, transportation, heavy manufacturing, chemical production, printing and publishing, electronics, textiles, and the like. Aggregating data collected from or about multiple assets can enable users to improve business processes, for example by improving effectiveness of asset maintenance or improving operational performance if appropriate industrial-specific data collection and modeling technology is developed and applied.

Field service software can be used by a technician while out in the field performing various duties such as maintenance, repairs, part-replacement, cleaning, inspecting, and the like. The field service software may provide the technician with a daily schedule, instruction manuals, work orders, parts lists, signed documents, location-based maps, and the like. For example, the field service software application may be executed by the client device operated by the technician and may provide a user interface that enables consistent access and targeted service workflows for a group of technicians out in the field and interacting with the same back-end mobile application database file. Through the field service software, the technician can successfully complete complex work orders, present service reports for customer signature, and provide dynamic pricing of labor, parts and products. Furthermore, as updates are made by other technicians to the back-end database, and updates are made by a technician to a local database, the sync gateway can merge the changes, perform conflict resolution, and update both the back-end database and the local client database accordingly.

The sync gateway can generate a mobile application database file that is directly consumable by a mobile client. The mobile application database file may include unique user-specific service flow manager configuration data to support client-side custom application behaviors and which is downloaded by the sync gateway on behalf of the client based on one or more configuration tokens provided by client device. The sync gateway supports transport of an extensible set of service related custom objects for use in field service and also supports delivery of objects and fields in accordance with the Sales Force Dot Com (SFDC) security model. The sync gateway includes a plurality of asynchronous threads that interact with the host platform to quickly download the client data. Furthermore, the sync gateway can transfer the client data to the client device in the form of a simple binary transfer that supports recovery from interrupted database downloads. Furthermore, the asynchronous threads support scalable processing both vertically and horizontally and eliminates the single-threaded JavaScript sync engine.

Figure 1:
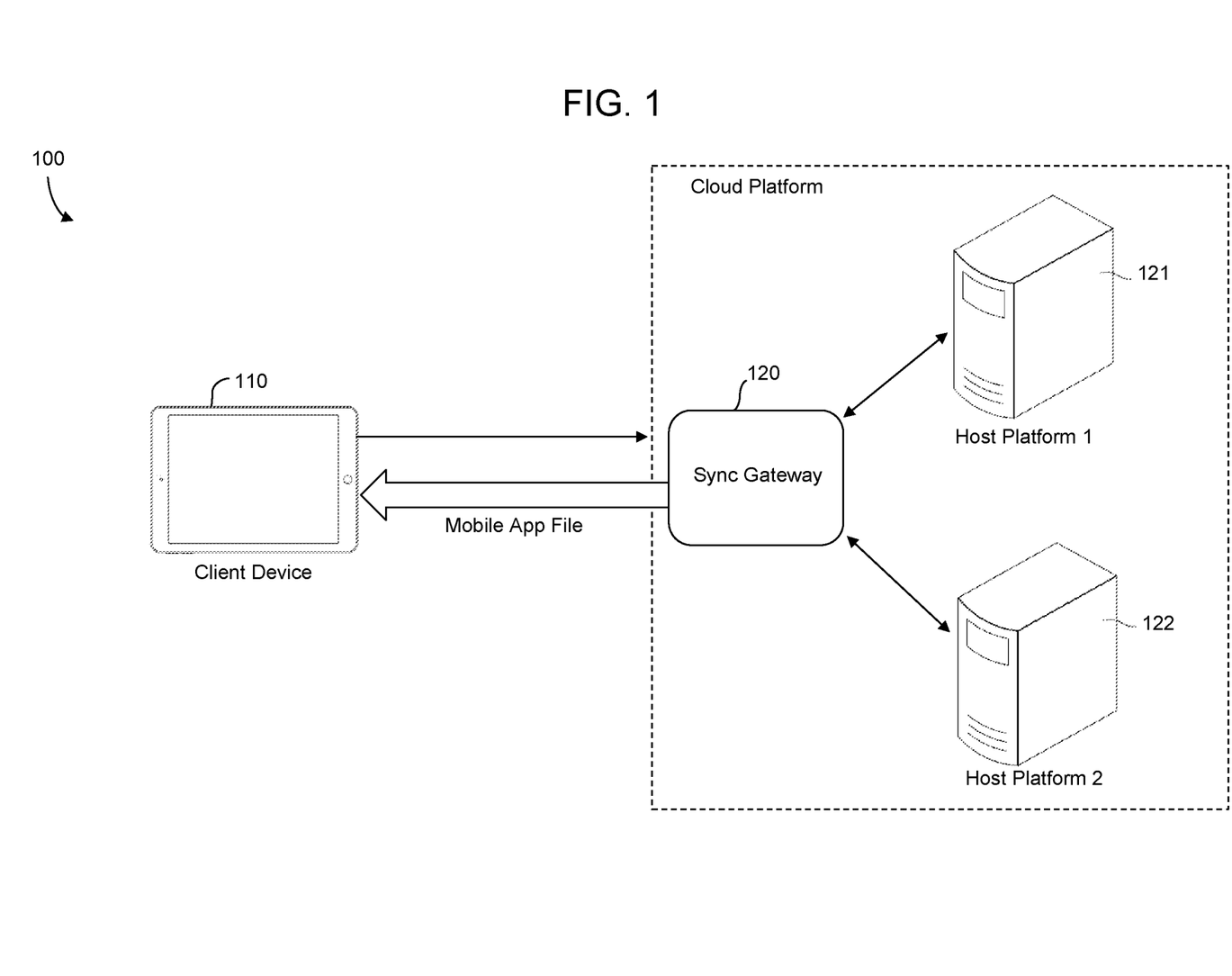
FIG. 1 is a diagram illustrating a synchronization system for a mobile application in accordance with an example embodiment.

FIG. 1 illustrates a synchronization system architecture 100 for a mobile application in accordance with an example embodiment. For example, the mobile application may be a field service application that facilitates service of machine and equipment in an industrial manufacturing environment. Referring to FIG. 1, the system architecture 100 includes a client device 110 which may be a user device such as a tablet, a mobile phone, a laptop computer, a notepad, a computer, a smart-wearable device, and the like. The client device 110 may be used by a technician or other user while out in the field. The system architecture 100 also includes a cloud resident sync gateway 120 and a plurality of host platforms 121 and 122. In this example, the sync gateway 120 (and the components thereon) may be connected to the client device 110 via a network such as the Internet, a private network, and/or the like. FIG. 1 is a diagram illustrating a synchronization system for a mobile application download in accordance with an example embodiment.

According to various embodiments, the host platforms 121 and 122 may host a mobile software application including configuration data and transaction data which is used by the client device 110. The configuration data may be used to identify the client 110 with the host platforms 121 and 122. Meanwhile, the transaction data may be the application data that is downloadable to the client device 110 for use by the client (e.g., field service data). It should also be appreciated that many client devices may interact with the mobile application software such as other technicians from the same organization, and the like. As a result, changes may be periodically or continuously made to the mobile application data stored on the host platforms 121 and 122. These updates may be downloaded by the sync gateway 120 and transferred to client device 110 in order to synchronize a mobile application database file stored on the client device 110 with a most up-to-date version of the mobile application database file stored on the host platforms 121 and/or 122. For example, the client device 110 may transmit a request to the cloud platform to initiate a download of a mobile application file (e.g., SQLite database file). The request may be received by one or more of the sync gateway 120, host platform 121, host platform 122, and the like. The request may include configuration information (e.g., tokens) that enable the sync gateway 120 to stand in the place of the client device 110 and interact with the host platforms 121 and 122. For example, the configuration information may include an authentication token and a user-profile that identifies user-specific data of the mobile application to be downloaded to the client device 110 from the host platforms 121 or 122.

In response to the request, the sync gateway 120 may download the mobile application data from one or more of the host platforms 121 and 122, and build the mobile application file for delivery to the client device 110. In this example, the sync gateway 120 may be a microservice or other software program executing within the cloud platform which also includes the host platforms therein. Accordingly, the connection between the sync gateway 120 and the host platforms 121 and 122 may have relatively low latency. In addition, as shown and described below with respect to FIG. 2, the sync gateway 120 may include a plurality of threads capable of simultaneously downloading data from the host platforms 121 and 122 thereby improving download speed in comparison to the client device 110 attempting to download data directly from the host platforms 121 and 122. The sync gateway 120 generates or otherwise builds the mobile application database file for the client device 110 and transfers the mobile application file to the client device 110 via a network connection such as the Internet. There are multiple types of downloads including an initial sync download and a subsequent incremental sync download, as further described in various examples herein.

Figure 2:
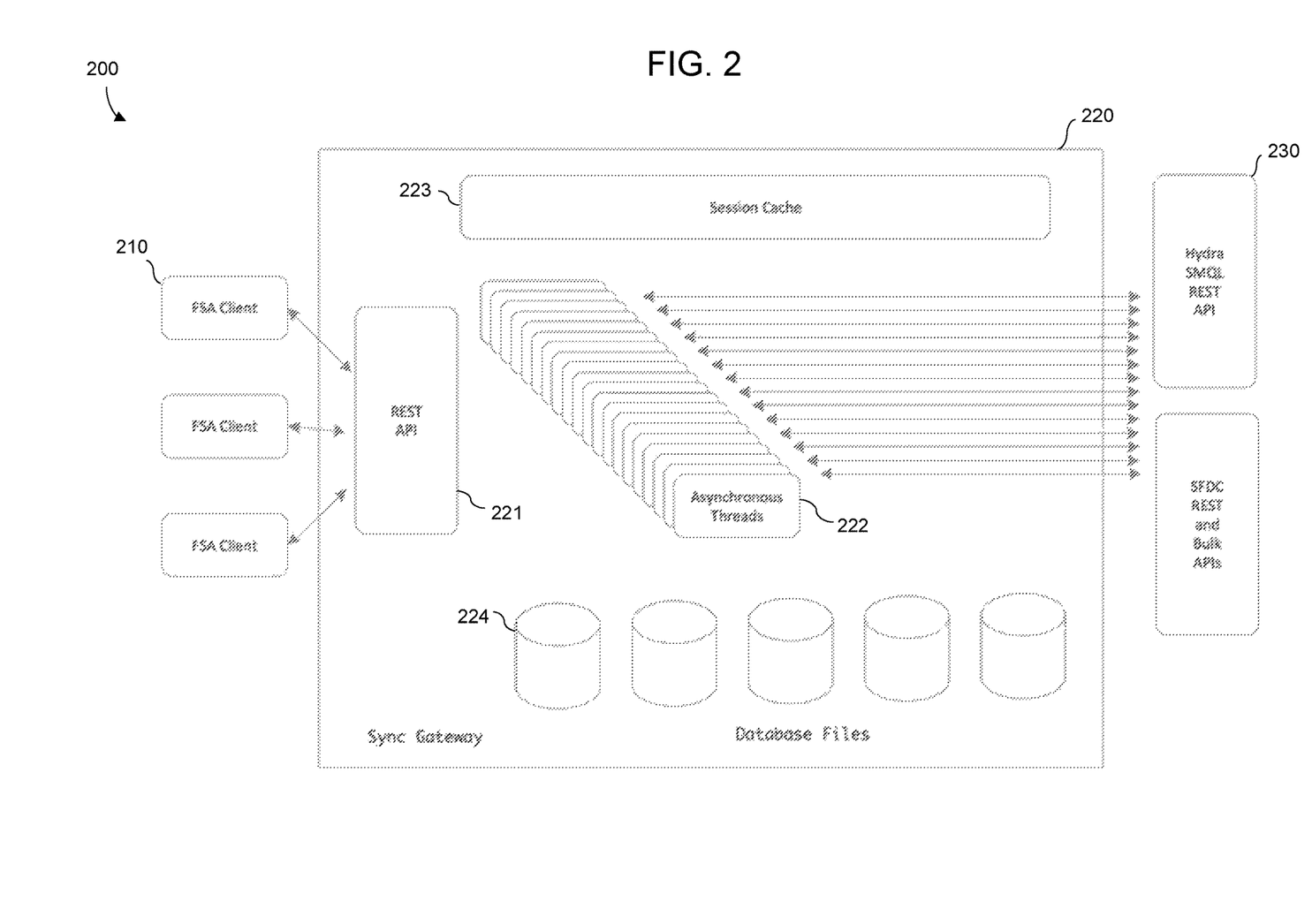
FIG. 2 is a diagram illustrating a sync gateway in accordance with an example embodiment.

FIG. 2 illustrates a sync gateway system architecture 200 in accordance with an example embodiment. Referring to FIG. 2, the architecture 200 includes a sync gateway 220 that downloads mobile application data from one or more host platforms 230 and delivers the mobile application data to for one or more client devices 210. In this example, the sync gateway 220 includes a REST API 221, a plurality of asynchronous execution threads 222, a session cache 223, and a plurality of database files 224. The sync gateway 220 may be a spring boot servlet-based micro service that is highly scalable and adapted to run as a clustered service natively within a public cloud or a back-end server.

A client device 210 may interact with the sync gateway 220 via the REST API 221. The REST API 221 exposes three endpoints to the client device 210 and they include an initial or initiate sync request, a status request, and a download a completed database request when the download from the host platform 230 is complete. The asynchronous threads 222 perform simultaneous data processing operations which may or may not be in parallel. For example, when a sync operation (e.g., initial or subsequent/incremental) is initiated, the REST API 221 may launch one or more asynchronous threads 222 to interact with the platform 230 based on configuration information received from the client device 210. The asynchronous threads 222 may gather data and store the data within the database files 224 which is to be delivered to the client device 210. The asynchronous threads may build a database file such as a SQLite database file that includes the data downloaded from the host platform 230 and which is to be delivered to the client device 210. The asynchronous threads 222 may be launched in parallel to optimize the performance of the sync operation.

The session cache 223 is used to pass a session state between the asynchronous threads 222 and a controller of the REST API 221. For example, when the client device 210 initiates a session by performing an initial sync request, the sync gateway 220 may generate a session ID that can be used by the client device 210 for subsequent requests. The session ID may be passed to the client device 210 in subsequent requests using a parameter such as JSESSION ID, and the like. The session ID may also be used by a session controller to select database files for download at the end of a sync operation.

There are two types of sync requests that can be made by the client device 210 and they include an initial sync and an incremental sync. For example, a sync request may include an HTTP request such as HTTP POST. The initial sync is a first sync request made by the client device 210 such as when the client device turns on or accesses the mobile application for the first time or the mobile app database file stored on the client device 210 has been deleted or emptied. In response to the initial sync request, the sync gateway gathers all data of the mobile application from the host platform 230 that is relevant for the specific technician that initiated the sync request, builds (and encrypts) a database file including the mobile application data, and transfers the database file to the client device 210. The incremental sync request occurs each time a subsequent sync request is made by the client device 210 after the initial sync request. In this example, the sync gateway 220 builds a database file containing the records of the host platform 230 that have changed since the last sync operation. The database that is uploaded may include tables containing the records that have been modified by the mobile device user.

While the asynchronous threads 222 are downloading data from the host platform 230 and building the mobile application database file for the client device 210, the client device may submit a status request which is the second endpoint exposed by the REST API 221. For example, the status request may be an HTTP GET request. In response to receiving the status request from the client device 210, the sync gateway can determine a download progress of the database file and provide the client device 210 with a metric or other indicator that identifies the progress of the download.

After the mobile application database file has been generated for the client device 210, the mobile application database file can be stored in database files 224. At this point, the sync gateway 220 may automatically provide the mobile application database file to the client device 210 via the REST API 221, or the sync gateway 220 can wait for a third endpoint (i.e., a download request) to be received from the client device 210. Upon receiving the request (or automatically), the sync gateway 220 can perform a binary transfer and transfer the mobile application database file to the client device 210 via the REST API 221. For example, the header for the download request must include a range attribute set to an integer value reflecting the offset from the beginning of the file which represents the starting point of the download. This feature may be used to restart the download from the last bit that was received, in the event that the transfer is interrupted before completion. In this case, the client may initiate another download request with the range attribute set to one byte greater than the download length transferred before the interruption occurred.

When the SQLite database is being built, it may be encrypted (e.g., using SQLcipher). If this is an initial sync operation, the sync gateway 220 may generate a unique key to support the encryption and pass it to the client using the dbKey parameter. A response from this request will be the SQLite database file. The response header may contain a field named Content-MD5. The value of this field may be a 32 hex character md5 checksum for the entire database file. The client may validate this checksum before processing the incoming database file. A failure will precipitate a new download sequence. Before the SQLite database build operation starts, the sync gateway 220 may examine the client-specific settings (e.g., user profile, group profile, etc.) to determine whether the database should be encrypted or not. This setting may be conveyed to the client using a dbEncryption flag in the response. If this setting indicates that the database should be encrypted, and if this is an initial sync request, the sync gateway 220 may generate a unique key to support the encryption and pass it to the client using the dbKey parameter.

If this download is part of an incremental sync request, then the download database may be encrypted using the key that the client has passed in using the dbKey parameter from the initial POST request. If the initial sync request syncType parameter is set to "Incremental", the database image may only contain the tables and records that have changed on the backend. This database may include a table which contains a record for each backend record that has changed since the last sync operation. It is then up to the client device 210 to merge this changed database with its local database.

Figure 3A:
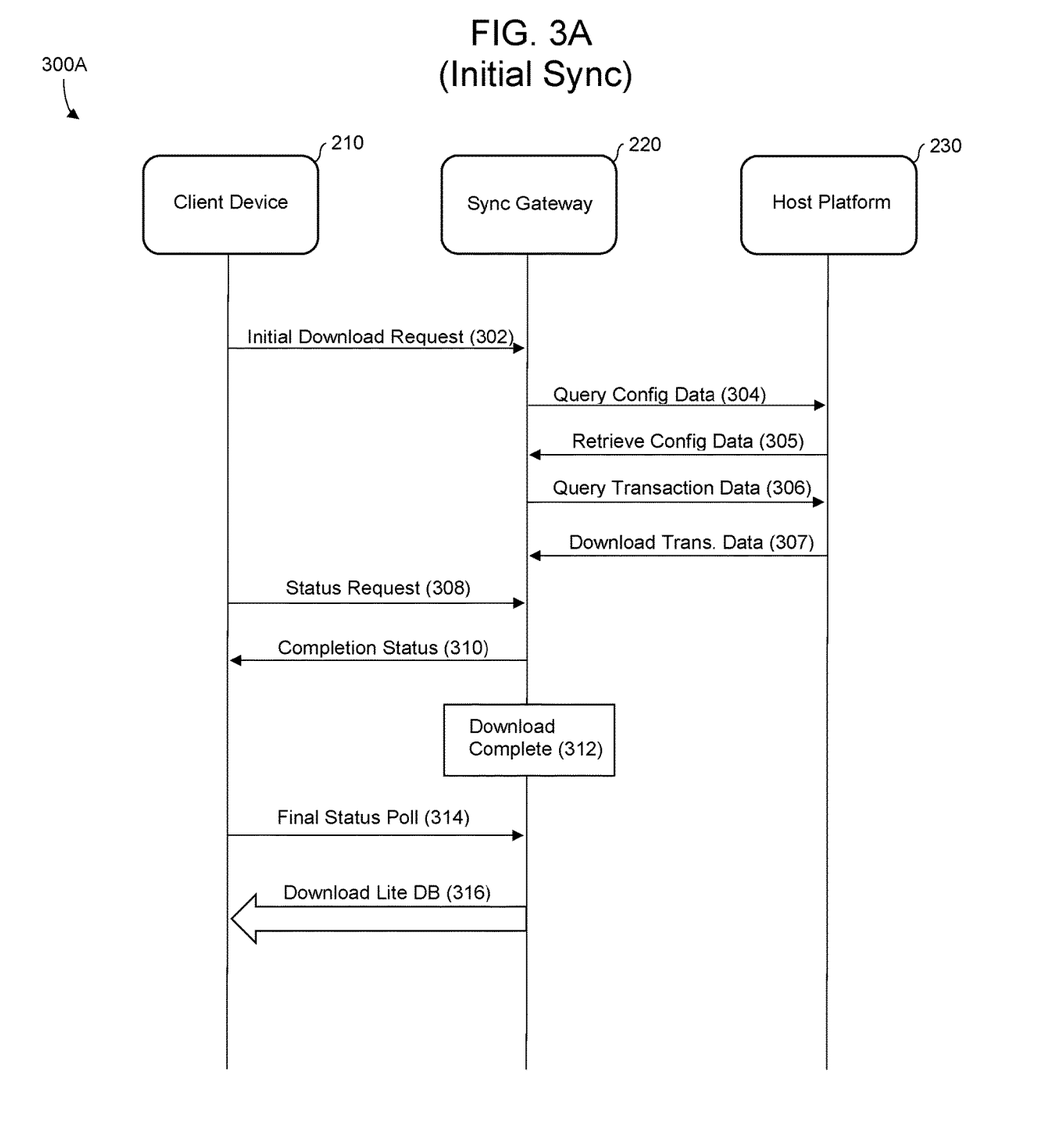
FIGS. 3A and 3B are sequence diagrams illustrating a process of performing a synchronization operation in accordance with an example embodiment.
Figure 3B:
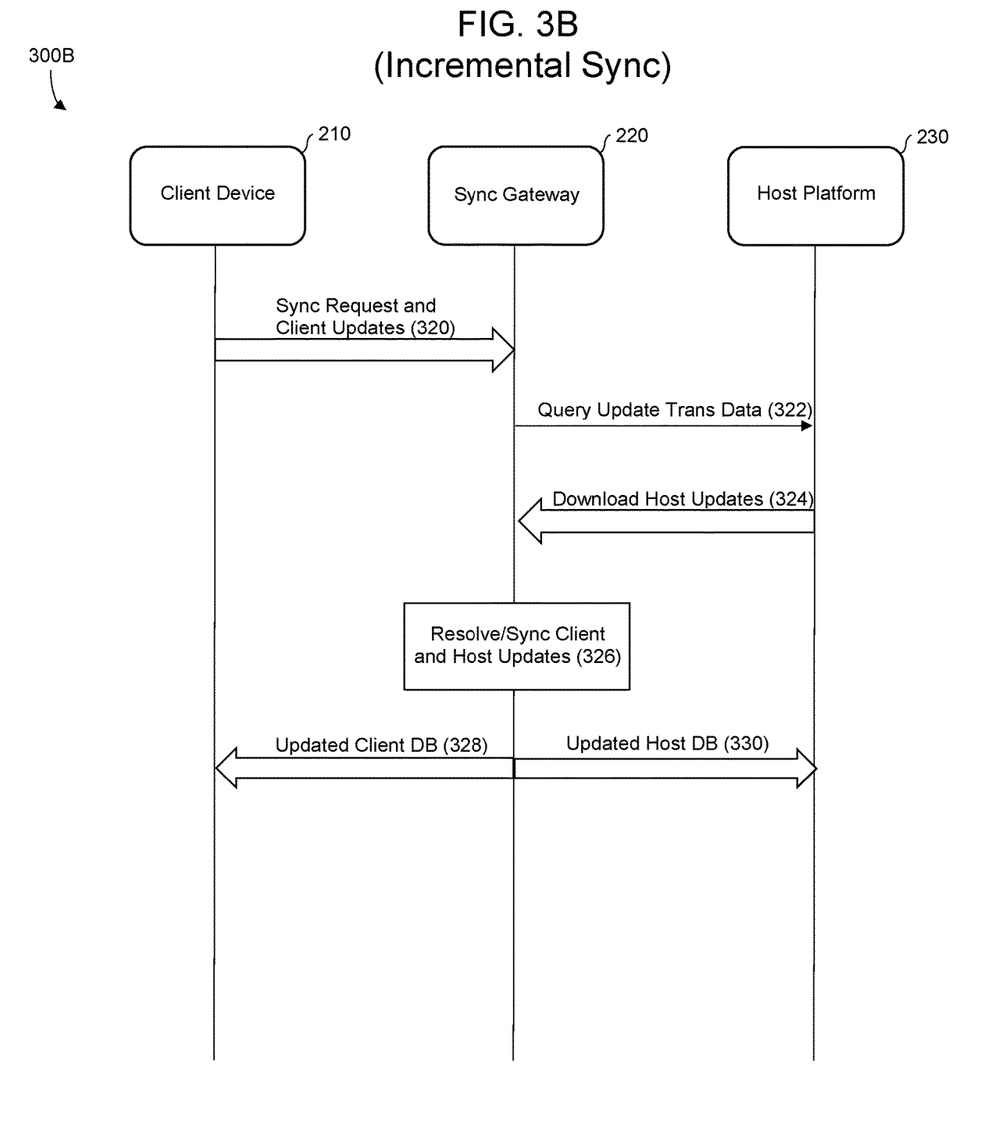

FIGS. 3A and 3B illustrate a process of performing a synchronization operation in accordance with an example embodiment. FIGS. 3A and 3B are based on the sync gateway architecture shown in FIG. 2 and include the client device 210, the sync gateway 220, and the host platform 230. Referring to FIG. 3A, an initial sync process 300A is shown in which the client device 210 receives an initial download of a mobile application data file. In 302, the client device 210 transmits an initial download request to the sync gateway 220. In these examples, there are two different sync operations between the client device 210 and the host platform 230. The first is initial sync which is a case where the client device 210 has been turned on for the first time, deleted its previous file, etc. Here, the client device 210 has installed the mobile application and it has an embedded empty database. The database needs to be filled with transaction data that is useful for the specific technician. The technician may logon to the host platform 230. The client device 210 may authenticate with the platform and in response receive two tokens from the platform (authentication token and a refresh token). When ready to do a sync operation, the client device 210 interacts with the sync gateway 220 and passes along the refresh token and the authentication token to enable the sync gateway 220 to interact with the host platform 230 on behalf of the client device 210.

During the initial sync, the mobile application executing on the client device 210 may initiate a REST interaction with the sync gateway to initially download the client's data. For the initial sync, the sync gateway 220 may query and retrieve configuration information of the client device 210 from the host platform 230. In addition, the sync gateway 220 may query and retrieve transaction data for the application file from the host platform 230 based on the configuration information. The sync gateway 220 builds an initial sync database for the client device 210 based on the transaction data. For example, the sync gateway 220 may use the mobile configuration data retrieved from the platform 230 to construct the dynamic platform queries that retrieve the transaction data from the platform that is relevant to the technician's profile. This transaction data (along with a portion of the configuration data) is then loaded into the database that is ultimately delivered to the client device 210.

The configuration data defines the sync operation that takes place. There are configuration settings in the platform that allow the client to define what data is retrieved and passed down to the mobile client device (which objects and which related objects). The configuration data may include local settings, general settings, download criteria and advanced download criteria. In response, the sync gateway 220 transmits a query for configuration information of the client device 210 which was included in the request to the host platform 230, in 304, and retrieves the configuration information from the host platform 230, in 305. Here, the sync gateway 220 can use the configuration information of the client device 210 which may be provided via the initial query/response, to stand in the place of the client device 210 and download mobile application data intended for the client device 210.

Based on the content of the configuration data, the sync gateway 220 generates queries and dynamically forms the queries for interacting with the host platform 230 and downloading the specific data for the client device 210 via the querying and retrieving of transaction data in 306 and 307. This initial sync download can take a larger amount of time (e.g., 1 minute, 5 minutes, 10 minutes, 30 minutes, 1 hour, etc.) As a result of the retrieving of the data, the sync gateway 220 may build a database (also referred to herein as a mobile application file) for the client which is used to populate the client database of the mobile application on the client device 210. Prior to the download being completed, the sync gateway 220 may receive a progress request 308 from the client device 210. In response, the sync gateway 220 may generate and send a completion status response 310 providing a metric which indicates the progress of the download initiated in 306. Furthermore, in 312 the download completes and the sync gateway 220 builds the mobile application database file for delivery to the client device 210.

As a result, the sync gateway 220 has completed the building of the initial client database (which is a file stored in the sync gateway 220) and has a session ID identifying the client device 210. There is an optional configuration setting enabling the initial download file to be encrypted. Once the build is finished by the sync gateway 220, there may be a final status poll 314 that may be provided to the client device 210 to enable the client device 210 to see that the sync gateway 220 is done. In response, the client device 210 may request that the database file be transferred from the sync gateway 220 to the client device 210, in 316.

Referring to FIG. 3B, an incremental sync process 300B is shown in which the client device 210 receives a subsequent download of a mobile application data file that has been previously downloaded and updated/modified by the host platform 230 (e.g., as a result of other users interacting with the mobile application data on the host platform 230). In this example, the client device 210 already has its initial data package, but the technician has done some work on their side and has updated the local database file, and the database on the host platform 230 has also changed as a result of other user's interacting with the data from the host platform 230. Accordingly, the database files on the two sides have changed and need to be synchronized by an incremental sync. The incremental sync process uses a smaller database file from the client device 210 which only includes the changes on their side. During an initiate request 320, the client device 210 sends a database with the changes that have occurred since the last sync operation. The sync gateway 220 receives the client updates, and then makes a request 322 for all the records (e.g., transaction data) that have changes that correspond to the user's profile. It knows the user-specific data based on the configuration information (e.g., authentication token, refresh token, configuration tokens, etc. obtained from the platform) and receives, from the host platform 230, records stored therein that have changed since the last sync operation.

As a result of 324, the sync gateway 220 has two databases including the changes from the client device 210 (1$^{st}$ database) and the changes from the host platform 230 (2$^{nd}$ database). According to various embodiments, the sync gateway 220 may generate and transfer a respective update for each of the client device 210 and the host platform 230, and the respective updates merge with the previous data to update the changes on the respective sides. In some cases, there may be a conflict when the client device 210 and the host platform 230 have changed the same data record. In this scenario, there are two different values for this one record and it must be resolved. The sync gateway 220 recognizes the conflict and can resolve the conflict in one of three ways based on a configuration setting (back-end platform wins, client wins, or user chooses which side wins).

Figure 4:
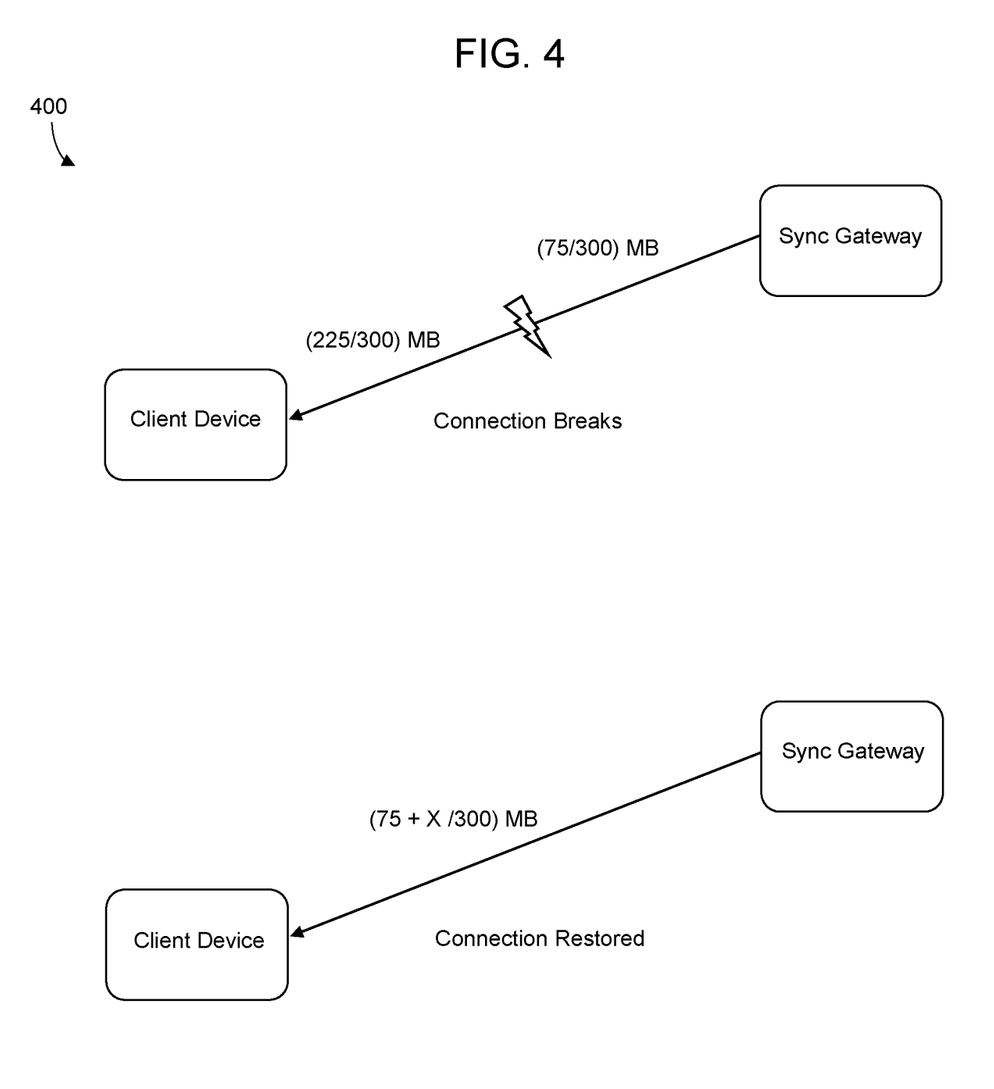
FIG. 4 is a diagram illustrating a process of resuming a synchronization operation when a connection is restored in accordance with an example embodiment.

FIG. 4 illustrates a process 400 of resuming a synchronization operation when a connection is restored in accordance with an example embodiment. In this example, a binary transfer of a mobile application database file is being performed from the sync gateway to the mobile client device via a network. If the connection is broken during an intermediate point of the transfer, the sync gateway may resume the transfer from that intermediate point when the connection is restored. For example, the client device may feedback a byte value or other indicator that identifies an amount of the binary transfer has been received by the client device prior to the connection being lost. In response, the sync gateway may add a buffer (e.g., one or more bytes) to the remaining amount of data to be transferred, and resume the transfer from the buffered location of the download/transfer.

One of the benefits is that the sync gateway is on the cloud platform (i.e. public cloud) along with the platform hosting the mobile application. The advantage here is that the sync gateway is parked in the public cloud and has a high performance low latency connection to the platform and therefore is not liable to drop connection to the platform, even if the client connection is broken. As a result, the client does not need to maintain a continuous connection to the back-end in order to successfully receive the mobile application database file. Furthermore, the data is stored by the sync gateway 220 so that it can identify a user and their respective data. Each user's data may be stored in a relational database. The user has a user ID and a group ID which are used to form queries which are specific to that user or a profile that includes that user and a few other users. The sync gateway may also be an instance executing in the cloud.

Figure 5:
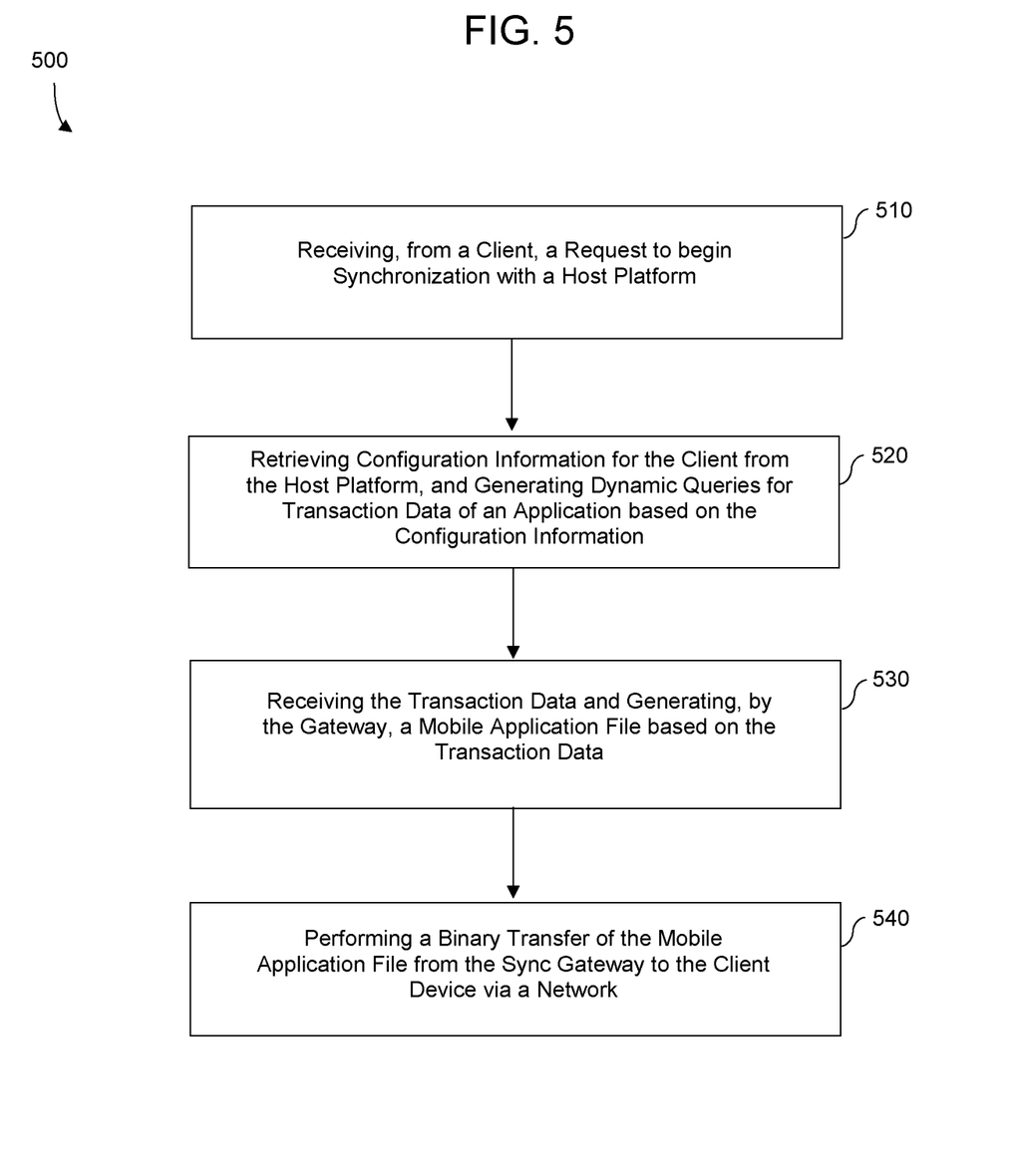
FIG. 5 is a diagram illustrating a method for performing synchronization in accordance with an example embodiment.

FIG. 5 illustrates a synchronization method 500 in accordance with an example embodiment. For example, the synchronization method 500 may be performed by a sync gateway included within a computing device such as a cloud platform, server, or other computing device. Referring to FIG. 5, in 510, the method includes receiving, by the gateway, a request to synchronize a client database of a mobile application with a database of the mobile application stored on a host platform. For example, the request may be a request for an initial download or a request for a subsequent incremental synchronization download.

In 520, the sync gateway may query and receive configuration information from the host platform. The configuration information may be used by the sync gateway on behalf of the client device to interact with the host platform. The configuration information may include one or more client-specific tokens such as an authentication token for the client to use to authenticate itself with the host platform, one or more configuration tokens that define how data is to be downloaded from the host platform to the client device, and the like. Furthermore, the configuration information may include a user identification (user ID) and a group identification (group ID) which are associated with the client device and which uniquely identify a user profile with the host platform thereby identifying user-specific data to be downloaded for the client device. In addition, in 520 the method further includes generating, by the gateway, dynamic queries for transaction data of the mobile application which are constructed based on the configuration information.

In 530, mobile application data (i.e., transaction data) is received from the host platform based on the configuration information received from the client device. According to various embodiments, the gateway may include plurality of asynchronous threads that can simultaneously be used for downloading the mobile application data to the sync gateway from the host platform. For example, the threads can be configured as a pipeline where each thread or a plurality of threads are dedicated to a specific task which are performed as a pipeline. As another example, each thread can perform all tasks and operate simultaneously. The downloaded data from the host platform may be client-specific to the client device based on the configuration information received from the client device. The client-specific data may include a calendar, work orders, instructions, manuals, parts lists, documents, and the like, which the technician needs for field service for a given day or interval of time. In some embodiments, the gateway may receive another request for the mobile application from the client device while the downloading is still being performed by the gateway. In response, the gateway may reply with completion status information to the client device which indicates a progress of the mobile application file download thereby providing the client with progress information.

In 530, the method also includes generating or otherwise building a mobile application file for the client device based on the mobile application data downloaded from the host platform, and in 540, the method further includes transmitting, by the gateway, the mobile application file to the client device via a network connection. For example, the transfer may be a binary transfer, or the like. The mobile application file generated for the client device may be an initial download for the client device (e.g., when the client device is turned on, when a periodic interval restarts, etc.) or the mobile application file may be a subsequent incremental download of a previously downloaded file which the client device requests synchronization. Here, the sync gateway may generate an updated mobile application file to synchronize the client device mobile application file with a mobile application file which has been updated by other clients in the group and stored on the host platform.

According to various aspects, the request for the mobile application from the client device may include an initial download request, and the mobile application file downloaded by the sync gateway may be an initial build of a mobile application database file for the respective client device. As another example, the request for the mobile application from the client may include a request to synchronize a previously downloaded mobile application file on the client device with the mobile application data stored on the host platform. In this example, the downloading may include determining, by the gateway, updated mobile application data stored by the host platform based on the previously downloaded mobile application file on the client device, and downloading the updated mobile application data from the host platform. Furthermore, the request to synchronize from the client device may include updates to the previously downloaded mobile application file that have been created by the technician interacting with client device since the previously downloaded mobile application file was received by the client device. Here, the method may further include uploading the updates performed by the client device to the host platform to synchronize the mobile application data stored by the host platform and the mobile application file stored by the client device.

In some embodiments, a connection between the client device and the sync gateway may be interrupted during a download. In this example, the gateway may receive an identifier from the client device indicating a portion of the mobile application file that was received by the client device prior to the connection being broken, and transmit the remaining portion of the mobile application to the client device upon restoration of the connection without re-transmitting the portion that has already been received.

Figure 6:
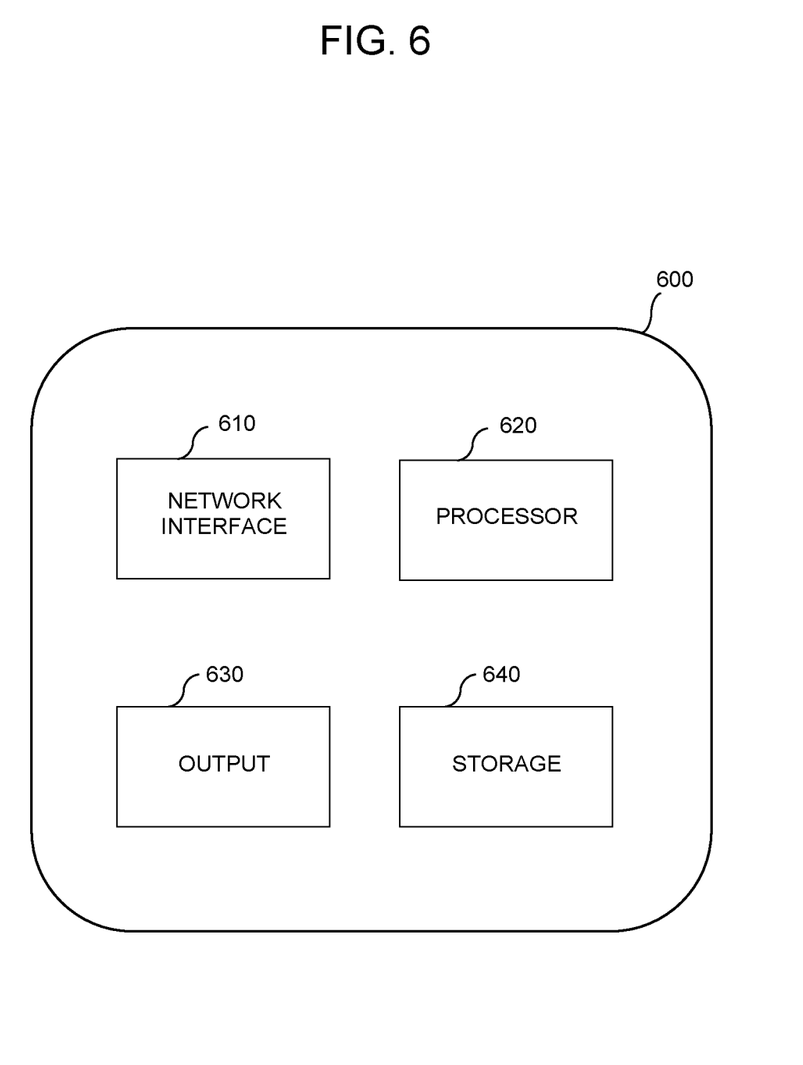
FIG. 6 is a diagram illustrating a computing system for performing synchronization in accordance with an example embodiment.

FIG. 6 illustrates a computing system 600 for performing synchronization in accordance with an example embodiment. For example, the computing system 600 may be a cloud platform, a platform, a user device, or some other computing device with a processor. In some embodiments, the computing system 600 may include both the sync gateway and one or more back-end host platforms. Also, the computing system 600 may perform the method 500 of FIG. 5. Referring to FIG. 6, the computing system 600 includes a network interface 610, a processor 620, an output 630, and a storage device 640. Although not shown in FIG. 6, the computing system 600 may include other components such as a display, an input unit, a receiver/transmitter, and the like. The network interface 610 may transmit and receive data over a network such as the Internet, a private network, a public network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the computing system 600, an externally connected display, a cloud, another device, and the like. The storage device 640 is not limited to any particular storage device and may include any known memory device such as RAM, ROM, hard disk, and the like.

According to various embodiments, the storage 640 may store software, code, a program, an application, and the like, for implementing the sync gateway. Here, the processor 620 may execute the sync gateway which instruct the processor 620 to perform the procedures described herein. The network interface 610 may receive a request for a mobile application from a client device. Here, the request may include configuration parameters for the client device to use to interact with a host platform of the mobile application. In response, the processor 620 may download, via the gateway, mobile application data from a host platform based on the configuration information received from the client device, and generate, via the gateway, a mobile application file for the client device based on the mobile application data downloaded from the host platform. In addition, the processor 620 may control the network interface 610 to transmit the generated mobile application file to the client device via a network connection. In some embodiments, the network interface 610 may receive another request for the mobile application from the client device while the downloading is still being performed by the gateway, and in response to the other request, the processor 620 may control the network interface 610 to transmit a completion status information to the client device which indicates a progress of the download.

The connection between the client device and the computing system 600 (and the sync gateway executed therein) may be unreliable or may become broken at some point during the download of the mobile application file to the client device. In this example, the processor 620 may receive, via the network interface 610, an identifier from the client device indicating a portion of the mobile application file that was received by the client device prior to the connection being broken, and control the network interface to transmit the remaining portion of the mobile application to the client device upon restoration of the connection without re-transmitting the portion that has already been received.

In some embodiments, the request for the mobile application received from the client device by the network interface 610 may include an initial download request, and the mobile application file generated by the processor 620 may include an initial build of a mobile application database file for the respective client device. As another example, the request for the mobile application received by the network interface 610 may include a request to synchronize a previously downloaded mobile application file on the client device with the mobile application data stored on the host platform. In this example, the processor 620 may determine, via the gateway, updated mobile application data stored by the host platform based on the previously downloaded mobile application file on the client device, and download, via the gateway, the updated mobile application data from the host platform. In addition, the request to synchronize received by the network interface 610 from the client device may include updates to the previously downloaded mobile application file that have been created by the client device since the previously downloaded mobile application file was received by the client device. In this case, the processor 620, via the gateway, may upload the updates to the host platform to synchronize the mobile application data stored on the host platform.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method comprising:
receiving, by a gateway device, a request for a mobile application from a client device, the request comprising configuration information for the client device to use to interact with a host platform of the mobile application;
downloading, by the gateway device, mobile application data from the host platform based on the configuration information received from the client device;
generating, by the gateway device, a mobile application file for the client device based on the mobile application data downloaded from the host platform; and
transmitting, by the gateway device, the mobile application file to the client device via a network connection,
wherein the gateway device comprises a pipeline of threads that simultaneously perform the downloading of the mobile application data and the generating of the mobile application file.

2. The computer-implemented method of claim 1, wherein the configuration information comprises a user identification (user ID) and a group identification (group ID) which are associated with the client device and which uniquely identify a user profile for the mobile application with the host platform.

3. The computer-implemented method of claim 1, wherein the method further comprises receiving, by the gateway device, another request for the mobile application from the client device while the downloading is still being performed by the gateway, and in response to the other request, transmitting, by the gateway, completion status information to the client device which indicates a progress of a build of the mobile application file.

4. The computer-implemented method of claim 1, wherein, in response to the connection between the gateway device and the client device being broken during the transmitting of the mobile application file to the client device, the method further comprises:
receiving, by the gateway device, an identifier from the client device indicating a portion of the mobile application file that was received by the client device prior to the connection being broken, and transmitting, by the gateway device, the remaining portion of the mobile application to the client device upon restoration of the connection without re-transmitting the portion that has already been received.

5. The computer-implemented method of claim 1, wherein the request for the mobile application comprises an initial download request, and the mobile application file comprises an initial build of a mobile application database file for the respective client device.

6. The computer-implemented method of claim 1, wherein the request for the mobile application comprises a request to synchronize a previously downloaded mobile application file on the client device with the mobile application data stored on the host platform.

7. The computer-implemented method of claim 6, wherein the downloading comprises determining, by the gateway device, updated mobile application data stored by the host platform based on the previously downloaded mobile application file on the client device, and downloading the updated mobile application data from the host platform.

8. The computer-implemented method of claim 6, wherein the request to synchronize from the client device comprises updates to the previously downloaded mobile application file that have been created by the client device since the previously downloaded mobile application file was received by the client device, and the method further comprises uploading the updates to the host platform.

9. A computing system comprising:
a network interface configured to receive a request for a mobile application from a client device, the request comprising configuration information for the client device to use to interact with a host platform of the mobile application; and
a processor configured to download, via a gateway, mobile application data from the host platform based on the configuration information received from the client device, and generate, via the gateway, a mobile application file for the client device based on the mobile application data downloaded from the host platform,
wherein the processor further controls the network interface to transmit the mobile application file to the client device via a network connection, and
the gateway comprises a pipeline of threads controlled by the processor that simultaneously perform the downloading of the mobile application data and the generating of the mobile application file.

10. The computing system of claim 9, wherein the configuration information comprises a user identification (user ID) and a group identification (group ID) which are associated with the client device and which uniquely identify a user profile for the mobile application with the host platform.

11. The computing system of claim 9, wherein the network interface is further configured to receive another request for the mobile application from the client device while the downloading is still being performed by the gateway, and in response to the other request, the processor controls the network interface to transmit a completion status information to the client device which indicates a progress of a build of the mobile application file.

12. The computing system of claim 9, wherein, in response to the connection between the gateway and the client device being broken during the transmitting of the mobile application file to the client device, the processor is further configured to:
receive, via the network interface, an identifier from the client device indicating a portion of the mobile application file that was received by the client device prior to the connection being broken, and control the network interface to transmit the remaining portion of the mobile application to the client device upon restoration of the connection without re-transmitting the portion that has already been received.

13. The computing system of claim 9, wherein the request for the mobile application comprises an initial download request, and the mobile application file comprises an initial build of a mobile application database file for the respective client device.

14. The computing system of claim 9, wherein the request for the mobile application comprises a request to synchronize a previously downloaded mobile application file on the client device with the mobile application data stored on the host platform.

15. The computing system of claim 14, wherein the processor is configured to determine, via the gateway, updated mobile application data stored by the host platform based on the previously downloaded mobile application file on the client device, and download, via the gateway, the updated mobile application data from the host platform.

16. The computing system of claim 14, wherein the request to synchronize from the client device comprises updates to the previously downloaded mobile application file that have been created by the client device since the previously downloaded mobile application file was received by the client device, and the processor, via the gateway, uploads the updates to the host platform.

17. A non-transitory computer readable medium having stored therein instructions that when executed cause a computer to perform a method comprising:
receiving, by a gateway, a request for a mobile application from a client device, the request comprising configuration information for the client device to use to interact with a host platform of the mobile application;
downloading, by the gateway, mobile application data from the host platform based on the configuration information received from the client device;
generating, by the gateway, a mobile application file for the client device based on the mobile application data downloaded from the host platform; and
transmitting, by the gateway, the mobile application file to the client device via a network connection,
wherein the gateway comprises a pipeline of threads that simultaneously perform the downloading of the mobile application data and the generating of the mobile application file.

* * * * *